UNITED STATES PATENT OFFICE.

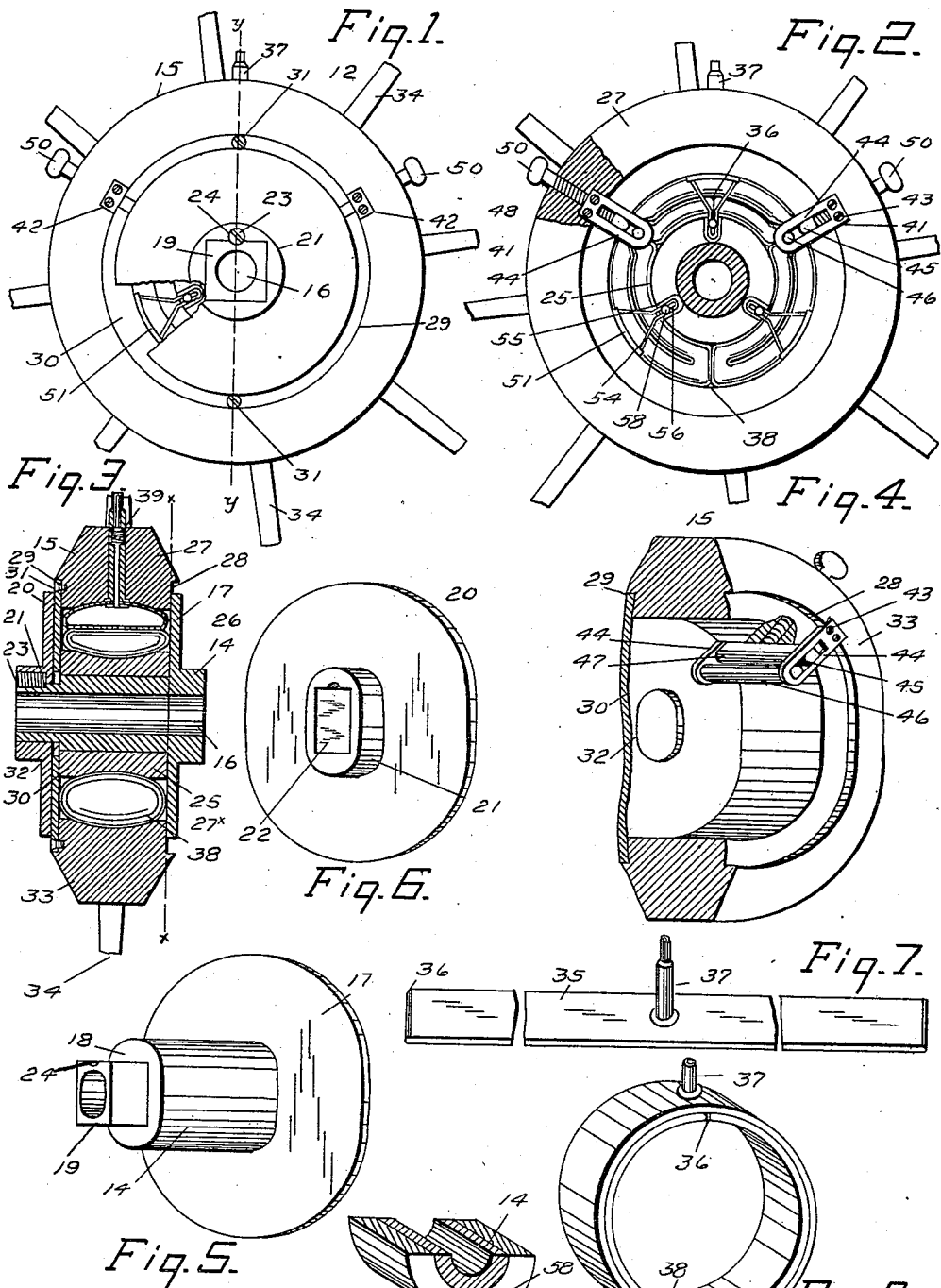

ABRAHAM T. BEELER, OF KANSAS CITY, MISSOURI.

WHEEL FOR MOTOR-VEHICLES.

1,016,200. Specification of Letters Patent. Patented Jan. 30, 1912.

Application filed October 14, 1910. Serial No. 587,076.

*To all whom it may concern:*

Be it known that I, ABRAHAM T. BEELER, a citizen of the United States of America, residing at Kansas City, in the county of Jackson and State of Missouri, have invented certain new and useful Improvements in Wheels for Motor-Vehicles; and I hereby declare that the following is a full, clear, and exact description of the invention, such as will enable others to make and use the same, reference being had to the accompanying drawings, forming a part of this specification.

The objects of my invention are: First: To obtain the maximum resiliency of the air or fluid in inflated cushions for wheels, for motor and other vehicles. Second: To provide a pneumatic, cushioned hub or boxing whose rotary motion is unretarded within itself.

The invention consists in the novel construction and combination of parts, such as will be first fully described and then specifically pointed out in the claims.

In the drawings: Figure 1. is a view in elevation partially broken away, of the outer side of the hub and inner portion of the spokes of a wheel, embodying the invention. Fig. 2. is a similar view of the inner side of the hub, with the inner disk removed, showing the inflated cushion or tube and tube sectioning clamps, and the means for governing the expansion of the sections of the tube when the inner part of the hub is off center, the said part being shown in section taken on the line $x$, $x$, in Fig. 3. Fig. 3. is a transverse, vertical, sectional view, taken on the line $y$, $y$, of Fig. 1. Fig. 4. is a perspective view of a portion of the spoke carrying member of the hub, showing one of the clamps for the inflation tube. Fig. 5. is a detail view, in perspective, of the inner part of the hub or bearing, and the inner disk forming an integral part thereof. Fig. 6. is a detail view, in perspective, of the outer, removable disk. Fig. 7. is a view of the inflation tube collapsed, and in an extended position. Fig. 8. is a view of the collapsed tube in position for insertion within the hub. Fig. 9. is a detail view, in perspective, of the adjustable saddle for governing the expansion of the sections of the inflated tube.

Similar numerals of reference indicate corresponding parts in all the figures of the drawings.

In the inflation tubes for the tires and hubs of the ordinary pneumatic, cushioned wheels for motor vehicles, the weight of compression of the wheels upon the inflated tube is such as to flatten the tube sufficiently to crowd the air in advance of the tread of the wheel upon the ground upwardly into the tube and in the rotary movement of the wheel its motion is not only retarded, but resiliency of the air upon which the vehicle depends has a negative result other than the cushioning effect desired.

In the application of the inflation tube to the hubs of vehicles the elasticity to be obtained from the air at all points in the radius of the hub becomes an absolute necessity, for the reason that upon the deflection of the axis of the wheel from a normal, axial center of rotation there must be a control of the air at all times to enable its elasticity to return the moving axis to its normal position, and which together with other important features are accomplished in my invention, the details of which are shown in the accompanying drawing.

Referring to the drawing, 12 indicates the resilient hub of a wheel constructed in accordance with my invention in two parts, viz., an inner part or member 14, concentric with the axle, and an outer, concentric spoke-carrying part or member 15, of increased circumference thereto. The part 14 consists of a thimble or bearing of the requisite length, and with its opening 16 extending therethrough, of the proper dimensions to receive the spindle upon an axle of a vehicle. Forming an integral part of the thimble or bearing 14, which is of uniform circumference, and the portion of said bearing a short distance inwardly from its inner end is a flat disk 17, the outer portion of which disk extends outwardly a considerable distance.

The outer end portion of the bearing 14 is reduced in dimensions for a short distance inwardly, as at 18, and the reduced portion squared or made rectangular, as at 19. Upon this portion 19, of the bearing, is fitted the removable disk 20, which is of the same circumference as the disk 17. The disk 20 is provided with a short hub 21, in the axle portion of which disk and hub is a rectangular-shaped opening 22, fitted to the square end portion 19, of the bearing 14, the hub 21 extending from the line of the outer surface of the disk 20, to the line of the outer end of said squared portion 19. The said disk 20 is secured on said squared portion 19, of the bearing 14, by means of a screw-key 23, which extends within a screw-threaded opening 24, extending in the longitudinal direction of the bearing 14, and within the adjacent parts of the hub 21, and the squared portion 19, of said bearing. Extending around the thimble or bearing 14 is a loosely fitted antifriction sleeve 25, of considerable thickness which acts to turn with the tube and thus prevent injury thereto in any sudden check in the rotation of the wheel. This sleeve extends in length from the line of the inner surface of the disk 17 to the line of the reduced portion 18, of the bearing 14. In the outer surface of the sleeve 25 is a slight depression or groove 26, extending around the sleeve and laterally to within a short distance of its ends. The outer part 15, of the hub, consists of a circular spoke-supporting plate or ring 27, of increased circumference to the said bearing and its sleeve 25, the line of the inner surface of the ring 27 being a short distance within the lines of the outer portions of the disks 17 and 20, and between which ring and the sleeve 25 is formed the annular space 27ˣ. In the vertical, inner side portions of the ring 27, adjacent the disk 17, is a recess 28, equal in depth to the thickness of the said disk, the circumference of the outer side of said recess being larger than that of the outer portion of the disk 17, to afford a play of the part 15, of the hub between the disks, as further described. In the other or outer side of ring 27, which extends in width to the line of the inner surface of the disk 20, is an annular recess 29, of the same circumference and depth as the recess 28. In this recess 29 is fitted the outer, circular portions of a flat plate 30, which is secured to the ring 27, by means of the screws 31, extending through said portions of the plate into the recessed portions of the spoke-carrying ring. In the central portion of the circular plate 30 is a circular opening 32, slightly larger in circumference than that of the bearing 14.

The outer surface of the plate 30 is ground smooth, or polished, and comes into frictional contact with the inner surface of the disk 20. From the line of the outer sides of the respective recesses 28 and 29, in the spoke-carrying ring 27, the sides of the outer portion of the said ring are inclined or beveled inwardly, in a slight degree, as at 33.

With the outer surface of the spoke-carrying ring are connected the inner ends of the spokes 34, these portions being connected at their outer ends with the rim of the wheel (not shown). The cushion or container for the fluid, such as air within the hub consists of a long, hermetical tube 35, composed of air-confining material, such as rubber, the tube having closed end portions 36, and provided with valved inflation nozzle 37, this nozzle being located at a point equi-distant from its sides and also from the ends 36, of the tube. In width the tube, collapsed as seen in Fig. 7, is slightly less than that of the sleeve 25.

Preparatory to the insertion of the tube within the hub, the portions of the tube each side of the nozzle 37 are folded together at 38, the ends of the tube meeting together upon the opposite side of the tube having the nozzle 37, and upon opposite sides of a vertical line extending through said nozzle, as seen in Fig. 8, the folded parts 38 forming practically the ends of the superposed tubes.

In the spoke-carrying ring or plate 27 is an opening 39, extending therethrough, and upon a line intersecting the longitudinal axis of the bearing 14, this opening being of the proper size to admit the reception of the nozzle 37 on the tube 35.

The controlling devices for controlling the body of the air within the pneumatic tube 35, when inflated, and for separating the tube into equal and separately-expansible sectional parts consist, as shown of clamps, which are constructed as follows. In the inner and outer side portions of the spoke-carrying ring 27, directly above the line of the outer sides of the respective annular recesses 28 and 29, and in transverse positions to each other, are the recesses or depressions 41 and 42, respectively. These transverse recesses are positioned upon each side of a line extending through the opening 39, for the nozzle of the tube 35, and at a distance from each other corresponding to one-third the circumference of the spoke-carrying ring 27. In each of the transverse recesses are secured by the screws 43, the outer ends of the radial clamp-supporting plates 44, the plates on the outer side of the spoke-carrying ring extending on the inner surface of the plate 30. The inner ends of the plates 44 extend inwardly, in the direction of the bearing 14, and to within a short distance of the sleeve 25, in the sides of which plates 44 are longitudinal slots 45, and in the ends of said slots are journaled the ends of the roller 46. Above said roller is a cylindrical clamping plate 47, the semi-cylindrical ends of said plate being reduced in size and extended within the slots 45, of the plate 44. In the spoke-carrying ring 27 are radial screw-threaded openings 48, as seen in Fig. 2, extending in the direction of the flat portion of the clamping plates 47, which are outwardly positioned, and in these screw-threaded openings are clamping thumb screws 50, the inner ends of which screws extend to and bear upon the flat surfaces of the clamping plates 47. In the insertion of the inflation tube 35, in the annular recess 26, of the hub, these screws 50 are turned so as to afford the widest space between the rollers 46 and the clamping plates 47, and at the same time the key screw 23 is removed from the bearing 14 and disk 20 is removed from the squared end 19, of bearing 14, and the bearing 14 itself, with its disk 17, is removed from the spoke-carrying part 15, of the hub. The nozzle 37, of the collapsed folded tube, as seen in Fig. 8, is then inserted from a position within the spoke carrying member upwardly into the opening 39, the upper end projecting a slight distance outwardly beyond the line of the outer circumference of the spoke-carrying ring 27, and the two folded ends 38, of the collapsed tube inserted between the rollers 46 and the clamping plates 47, of the respective clamps, the folded portions of the tube passing below the lines of these two clamps and the folded ends 38 brought closely together. The squared end of the bearing 14 is then inserted between folded parts of the tube, and thence through the opening 32, in the plate 30 and the disk 17 being in the recess 28, the outer disk 20 is secured to the squared end of the bearing 14, by the screw 23, and the tube 35 is in readiness to be inflated, which is accomplished in the well-known manner, through the valved nozzle 37. Upon the full inflation of the tube 35 the air passes into the folded parts of the tube, and when expended forms superposed cushions, as seen in Figs. 1, 2 and 3. The clamping screws 50 being turned to close the clamping plates 47 upon the inflated portions of the tube, the air space in the tube is practically divided into three distinct inflated sections, through which the passage of air is arrested completely, or to a limited extent, as desired, the two clamps with the folded ends 38 effecting the divisional separation of the tube into thirds of the circumference of the hub. As the clamps compress the outer, inflated portions of the tube, the rollers compress the air from the parts immediately in contact with the outer surfaces of the roller, and the air thus compressed tends to force the air inwardly around the roller, and expands the tube in that direction.

It will, therefore, be seen that in the support of the weight of the vehicle the separate air sections or cushions in the rotation of the wheels maintain the axis of the wheel in equilibrium, the elasticity of the air in the sections of the tube affording a perfect resiliency at all times, the superposed air sections contributing to this result in a high degree. Should this equilibrium of the axis of the vehicle be disturbed, as for instance of the forcible contact of the wheel with an obstruction, or in meeting a rut in the road, both of which will cause shock, the axis of the wheel being thrown off the center of rotation of the wheel, the bearing 14 compresses the air in one of the sections with greater force than is normally exercised by the weight of the vehicle, and consequently moving the other sections in the direction of movement of the bearing 14, and leaving a space in the upper part of the hub, between the outer surface of the outer, expanded portion of the superposed air sections, and the inner surface of the spoke-carrying ring 27, and thus permitting these parts to obtain a greater expansion of the air than is proper to act at the proper time to restore the equilibrium of the axis of the vehicle. For this purpose I provide a saddle 51, for each one of the sections of the inflated tube, which consist of plates of the desired length, formed in the arc of a circle and provided with a depressed portion 52, to fit the outer surface of the sections of the tube, the said plate being of the width corresponding to the length of the sleeve 25. These saddles are placed in position between the inner surface of the spoke-carrying ring 27, and the outer surface of the outer, expanded portion of the folded tube 35, and positioned as shown opposite the nozzle 37, for which purpose the plate 51 is provided with an opening 53, to permit the passage of said nozzle. The outer saddles support the two sections, whose ends meet at the point 38. With the respective sides and end portions of said saddle 51 are connected the ends of a single piece of wire, bent intermediate its ends to form a slotted neck 55, and from said neck the wires extend in opposite directions to and are connected firmly with the ends of the said saddle. The necks 55 extend to and are movable in recesses 56, made in the ends of the sleeve 25, on the bearing 14, and in the normal position of the saddles 51 are positioned nearly to the inner ends of the recesses. In the slotted necks 56, of the saddle connections are screws or pins 58, which enter the ends of the sleeve 25, at points near the outer circumference of the sleeve 25, thus permitting an adjustment normally, of the screw or pin in the slots of the necks 56. When a shock occurs to the wheel, sufficient to move the axis of the wheel off its center of rotation, or eccentrically to the circumference of the wheel, the pin 58, in the slotted neck 56, on connecting wires operating the saddle opposite the section of tube compressed by the shock moves inwardly to the end of the neck 56, and thus holds the saddle firmly upon the other section of the inflated tube, so that no undue expansion will occur in said section, in order to fill the space left momentarily by the said section when the shock occurs, and thus lessen the ability of the air to restore the equilibrium of the axle bearing. Upon the recovery of the wheel from the shock, the saddle 51, which has been instrumental in moving the inflated sections not subjected to shock toward the disturbed center of the wheel, now returns with the resiliency that said sections now exert to maintain the equilibrium of the axis of the wheel within the hub.

I am aware that various means have been employed to control a forward and rearward movement of a suspended hub backward and forward of the wheel center, which are entirely different from the purposes and results of my invention. While saddles have been employed for such purposes, the intent of my invention is to enable one sectional inflated portion of the tube to restore the equilibrium of the axle bearing to its center when another inflated section has been compressed by the deviation of the said axle bearing from its center from shock. In this respect a compression of one inflated section of the tube, will draw an opposite inflated section from contact with the spoke carrying member permitting said section to expand in a larger degree than the other sections. This expansion acts upon the saddle which it carries and is counteracted thereby and the force of the expansion is thrown upon the axle bearing member, and hence upon the recovery of the compressed section from its shock the axle bearing member is restored to the normal position concentric with the wheel center.

In the various movements of the saddles the connecting wires which are adjustably connected with the axle bearing member permit any lateral play that arises from compression or distortion of the inflated sections, the adjustments however being such as to limit the expansion of an inflated section at the precise time and in the precise degree.

In the employment of the wheel for vehicles, the movement of the disk 17, in the recess 28 and the opening 32, in the plate 30, permits the full, yielding movement in respect to the axis of the wheel necessary to the spoke-carrying ring 27, between the disks, and the disks afford great strength in support of the wheel.

I am aware that clamps have been employed to divide the inflated tube into inflated sections the jaw of which comprises a wire loop. These loops being rigid are liable to cut the tube when drawn downwardly upon the tube. In my invention the clamping roller when acting to clamp together adjacent parts of the tube and thus form inflated sections, obtains a partial rotary or yielding movement upon the tube as the air is displaced on each side of the roller gradually as the roller 46, closes upon the circumference of the tube to reduce the circumference and without injury to the tube.

The invention is applicable particularly to wheels for motor vehicles, for the necessary preservation of an even movement of the body of the vehicle for the even flow of the liquid to the carbureter, but the invention may be employed for ordinary wheels or to the inflated tire of wheels now in use, or for any purpose for which the resilient hub is adapted, and instead of air, other fluids may be employed to expand the tube, and such modifications employed as are within the scope of the appended claims.

Having fully described my invention, what I now claim as new and desire to secure by Letters Patent is:—

1. In a cushioned wheel the combination with a fluid expanded tube of a clamp, whose clamping parts yield to the displacement of the inflating fluid in the act of clamping adjacent parts of said tube together.

2. In a cushioned wheel the combination with a fluid expanded tube of a clamp for clamping adjacent parts of the tube and dividing said tube into inflated sections, said clamp having a clamping roller adapted to yield to the displacement of the inflating fluid in clamping said adjacent parts of the tube together.

3. In wheels for motor vehicles, an inflation tube having a valved nozzle intermediate its closed outer end portions and the parts of said tube on each side of the line of said nozzle folded together and divided substantially into inflated sections.

4. The combination with the annular spoke-supporting ring and the axle bearing having an annular space between said ring and bearing, ring-guiding disks on said bearing, a sleeve loosely mounted on said bearing, an inflated tube in the space between the opposing surfaces of said sleeve and said spoke-carrying ring, a saddle between said ring and tube, and connecting wires therefor, and a slotted neck constituting the ends of said wires, and a pin connecting said slotted neck with said sleeve on said bearing.

ABRAHAM T. BEELER.

Witnesses:
ROBERT O. McLIN,
ANNIE L. GREER.

Copies of this patent may be obtained for five cents each, by addressing the "Commissioner of Patents, Washington, D. C."